US007287772B2

(12) United States Patent
James

(10) Patent No.: US 7,287,772 B2

(45) Date of Patent: Oct. 30, 2007

(54) APPARATUS AND METHOD FOR SECURING AN AXLE TO A FRAME

(75) Inventor: Jesse G. James, Surfside, CA (US)

(73) Assignee: West Coast Choppers, Inc., Long Beach, CA (US)

(*) Notice: Subject to any disclaimer, the term of this patent is extended or adjusted under 35 U.S.C. 154(b) by 147 days.

(21) Appl. No.: 10/756,996

(22) Filed: Jan. 12, 2004

(65) Prior Publication Data

US 2005/0151346 A1 Jul. 14, 2005

(51) Int. Cl.
*B62K 25/02* (2006.01)
*F16H 7/14* (2006.01)

(52) U.S. Cl. ....................... 280/288; 180/227; 474/116

(58) Field of Classification Search ................ 280/288, 280/284–286; 301/125, 110.5, 111.07, 111.05, 301/111.06; 180/227; 474/116
See application file for complete search history.

(56) References Cited

U.S. PATENT DOCUMENTS 571,941 A * 11/1896 Bolte ......................... 280/288
589,852 A * 9/1897 Owen ......................... 280/288
641,637 A * 1/1900 Caswell ...................... 474/116
663,962 A * 12/1900 Dunlop ....................... 474/116
2,475,806 A * 7/1949 Simpson ..................... 474/116
4,540,062 A * 9/1985 Kashiwai .................... 180/227
4,634,139 A * 1/1987 Watanabe et al. ........... 280/288
4,667,762 A 5/1987 Ishino et al.
4,967,867 A 11/1990 Fuller
5,240,087 A 8/1993 Parker
5,469,930 A 11/1995 Wiers
5,546,665 A 8/1996 Jackmauh
5,704,442 A 1/1998 Okazaki et al.
D425,453 S 5/2000 Manescalchi
6,105,700 A 8/2000 Williams et al.
6,315,071 B1 * 11/2001 Gogo ......................... 180/219
6,393,939 B1 5/2002 Yamanaka
6,412,803 B1 7/2002 Lalikyan et al.
D498,179 S * 11/2004 James ....................... D12/110
D504,090 S * 4/2005 James ....................... D12/110
D505,367 S * 5/2005 James ....................... D12/160
D507,227 S * 7/2005 James ....................... D12/223
D511,124 S * 11/2005 James ....................... D12/117

* cited by examiner

*Primary Examiner*—Anne Marie Boehler
(74) *Attorney, Agent, or Firm*—Gary D. Mann; Fitch Even Tabin & Flannery

(57) ABSTRACT

Apparatuses and methods for securing and positioning an axle relative to a cycle frame are provided. An adjustor block is placed in a cavity of the cycle frame. The block can slide longitudinally within the frame cavity. An axle bolt is inserted into the cavity and seated against a bearing surface of the adjustor block for engagement with the adjustor block. The axle bolt is threadedly engaged with the axle, thereby coupling the axle to the adjustor block. An adjustor bolt is inserted into a bore in the cycle frame and used to move the adjustor block longitudinally within the frame cavity, which in turn moves the axle longitudinally relative to the frame. The frame and axle assembly are both functional and aesthetically pleasing without the use of axle covers.

21 Claims, 3 Drawing Sheets

APPARATUS AND METHOD FOR SECURING AN AXLE TO A FRAME

FIELD OF THE INVENTION

The invention described herein generally relates to an apparatus and method for securing and adjusting an axle to a frame, such as for example, the frame of a motorcycle.

BACKGROUND

Motorcycles typically include a frame that, directly or indirectly, is supported by front and rear axles and wheels. An axle dropout refers to that portion of a cycle frame that allows for removal of the axle. In many designs, the rear axle extends through a rear or dropout portion of the frame and is secured in place by an axle nut or axle bolt. The positioning of the axle relative to the frame can be changed by use of an axle adjuster. The axle nut can be loosened and the adjuster used to move the rear axle relative to the frame to change the tension in a drive chain or belt.

In some designs, portions of the rear axle or adjuster are covered. For example, rear axles and corresponding axle nuts can be covered with an axle end cap or cover. Some rear axle covers provide both functional and decorative additions to cycles. They can include brightly polished exteriors and can have ornamental designs or logos. However, it is desirable to have alternatives that do not employ axle covers yet provide both functional and aesthetically pleasing components for securing an axle to a cycle frame.

SUMMARY OF THE ILLUSTRATED EMBODIMENTS

Apparatuses and methods for securing and adjusting an axle to a frame are provided. According to one embodiment of the invention, an adjustor block is placed in a cavity of the frame and is able to slide longitudinally within the cavity. An axle bolt is inserted into the cavity and seated against a bearing surface of the adjustor block for engagement with the adjustor block. The axle bolt is threadedly engaged with the axle, thereby coupling the axle to the adjustor block. An adjustor bolt is inserted into a bore in the cycle frame and used to move the adjustor block longitudinally within the frame cavity, which in turn moves the axle longitudinally relative to the frame. The frame and axle assembly are both functional and aesthetically pleasing without the use of axle covers.

In accordance with another embodiment of the invention, a rear section of a cycle frame has inner and outer wall portions as well as a frame cavity. The inner wall portion defines a proximate opening extending into the frame cavity, and the outer wall portion defines a distal opening that also extends into the frame cavity and that is generally on the opposite side of the cavity as the proximate opening. Additionally, the cycle frame has a cycle frame bore that extends from the frame cavity.

An adjustor member, such as for example a block or other metal piece, is adapted to fit in the frame cavity and to slide longitudinally within the cavity. The member is retained within the cavity by a cover piece or plate that can be secured to the cycle frame. The adjustor member has a bearing surface for engaging an axle coupler when the axle coupler is placed in the cavity. By so engaging the axle coupler, any longitudinal movement of the adjustor member in the cavity will likewise cause a longitudinal movement of the axle coupler. The axle coupler, which for example could be an axle bolt or axle nut, in turn can engage the axle at one end of the axle.

An actuator, such as for example an elongated threaded member or a bolt, can be inserted into the cycle frame bore and used to move the adjustor member or block longitudinally within the frame cavity. Thus when the axle coupler is in the frame cavity and engaged with the adjustor member and with the axle, the actuator can be turned or otherwise moved to cause longitudinal movement of the adjustor member and thus the axle coupler within the cavity. This in turn moves the axle thereby permitting the desired amount of tension to be placed on a cycle chain or belt that is coupled to the axle.

In one aspect of the invention, the axle coupler has a generally cylindrically-shaped portion and the adjustor member bearing surface defines an opening adapted to mate with the axle coupler.

In another aspect, a frame plate or cover piece covers at least a portion of the frame proximate opening when the adjustor member is in the frame cavity. The cover piece has an opening that permits a portion of either the axle coupler or the axle to extend through the cover piece opening when the axle coupler is in engagement with the axle.

In another aspect, the axle coupler has a proximate end adapted to engage the first axle and a distal end. The axle coupler distal end is disposed within the cycle frame cavity when the axle coupler is in engagement with the first axle.

In yet another aspect, no portion of the axle coupler extends outside of the frame cavity through the cycle frame distal opening when the axle coupler is in engagement with the first axle.

In an alternative embodiment of the invention, a method of positioning a first axle with respect to a cycle frame is provided. The cycle frame has an inner wall portion, an outer wall portion and a frame cavity. The inner wall portion defines a proximate opening extending into the frame cavity. The outer wall portion defines a distal opening extending into the frame cavity. The cycle frame further has a cycle frame bore.

An adjustor member having a bearing surface is inserted into the frame cavity through the proximate opening. At least a portion of the frame proximate opening is covered with a frame cover piece or plate to secure the adjustor member in the cavity. An axle coupler is inserted into the frame cavity through the cycle frame distal opening so that at least a part of the axle coupler engages the bearing surface of the adjustor member. The first axle is engaged with the axle coupler in such a manner that a portion of either the axle coupler or the first axle extends through an opening in the frame cover piece. An actuator is inserted into the cycle frame bore and used to move the adjustor member longitudinally within the frame cavity which in turn positions the axle with respect to the frame.

There are additional aspects to the present invention. It should therefore be understood that the preceding is merely a brief summary of some embodiments and aspects of the present invention. Additional embodiments and aspects of the present invention are referenced below. It should further be understood that numerous changes to the disclosed embodiments can be made without departing from the spirit or scope of the invention. The preceding summary therefore is not meant to limit the scope of the invention. Rather, the scope of the invention is to be determined by appended claims and their equivalents.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Disclosed are apparatuses and methods for securing and positioning an axle relative to a cycle frame. Features are included that make the frame and axle assembly both functional and aesthetically pleasing without the use of axle covers.

Figure 1:
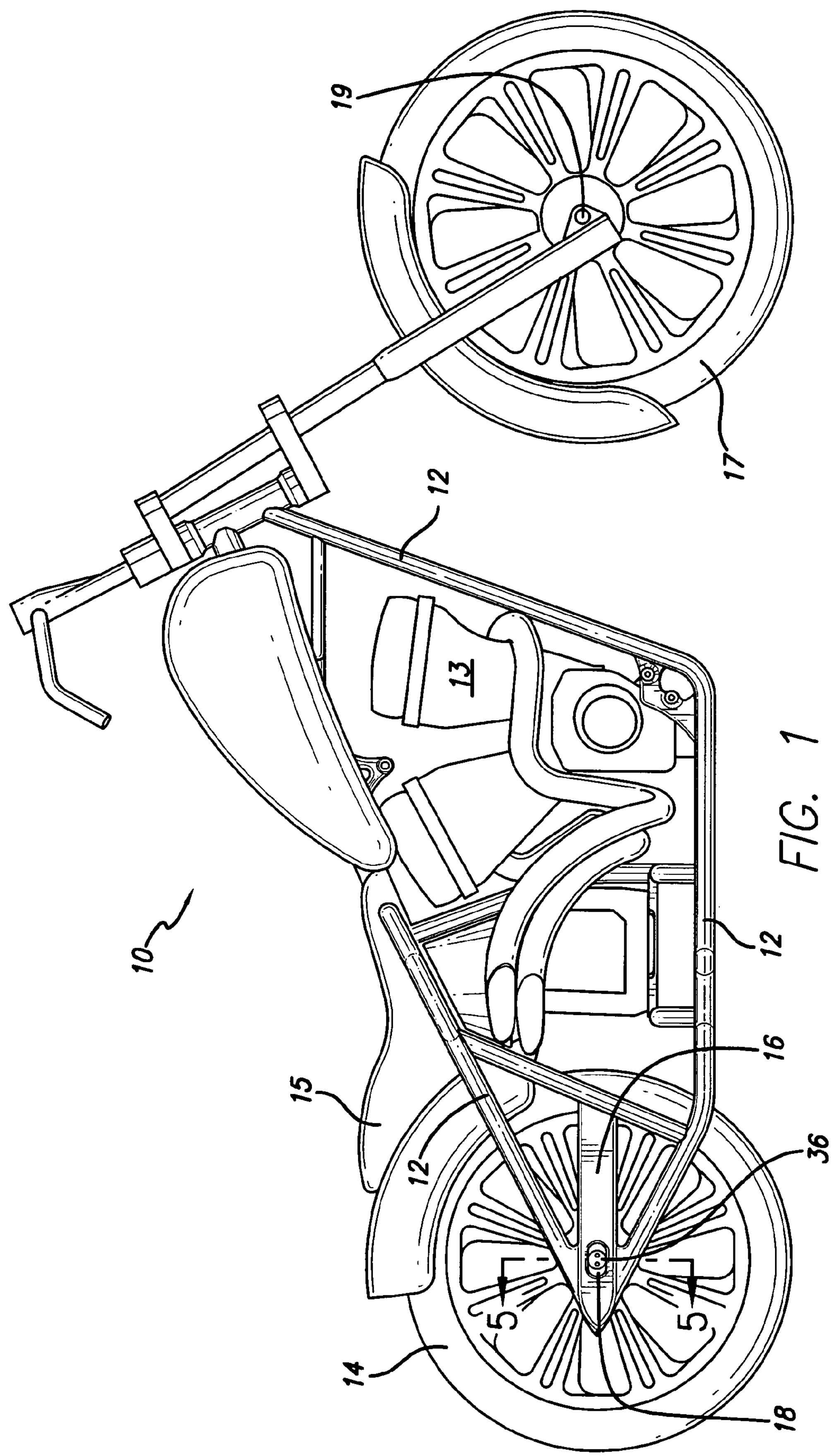
FIG. 1 is a side elevation view of a motorcycle in accordance with an embodiment of the invention.
Figure 2:
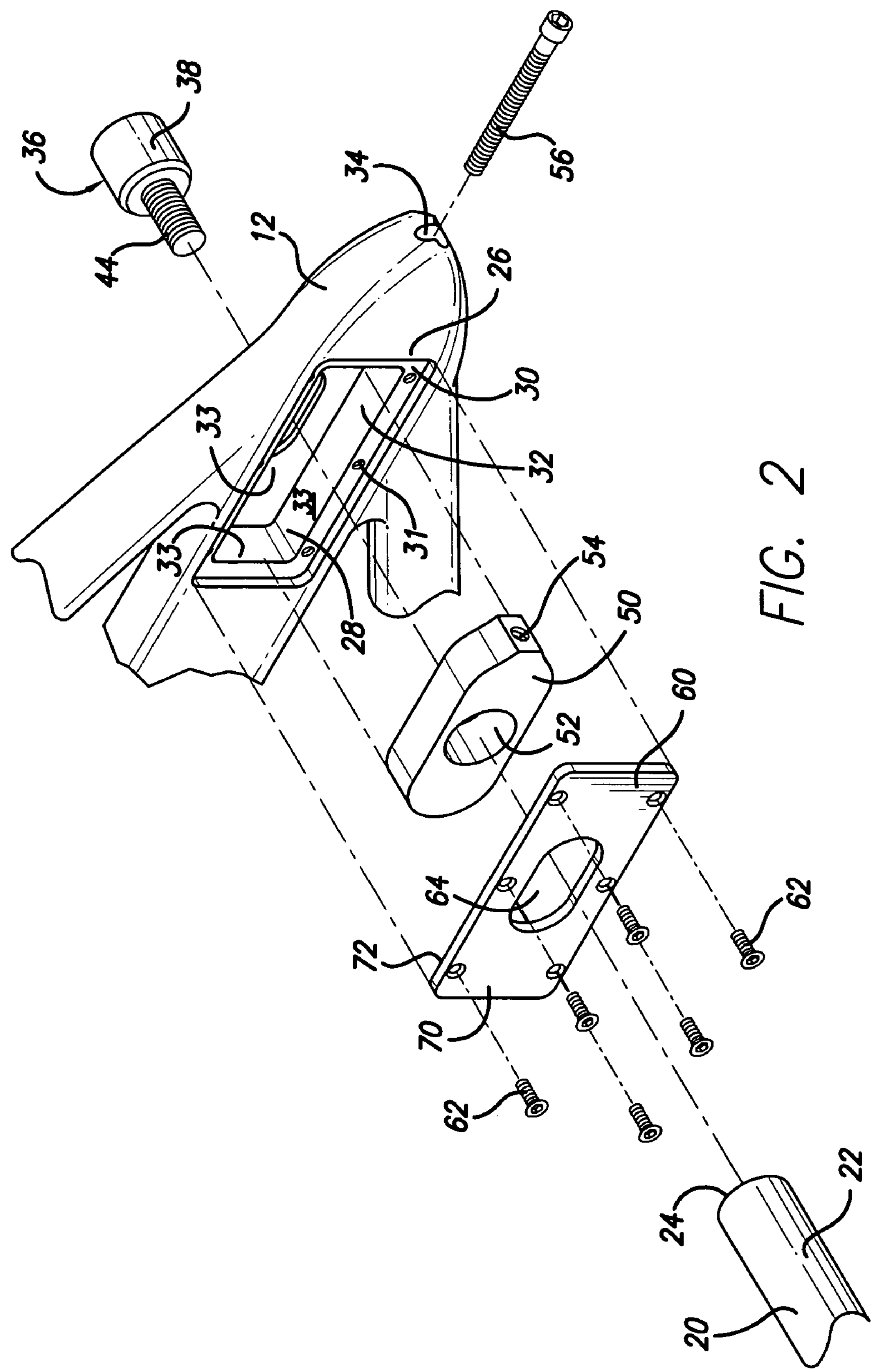
FIG. 2 is an exploded perspective view of certain axle mounting and related components of the motorcycle of FIG. 1.
Figure 4:
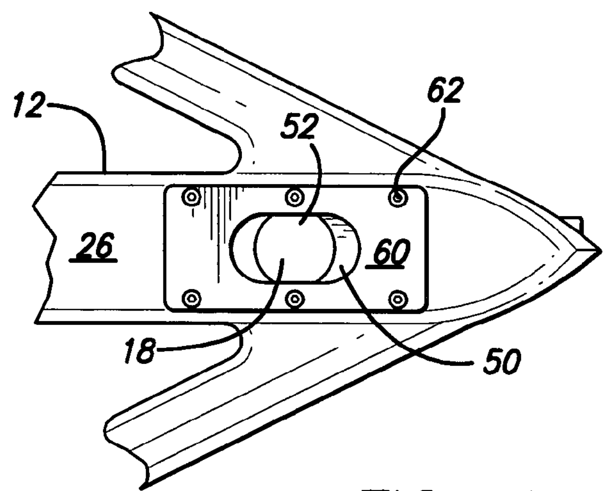
FIG. 4 is a side elevation view of a portion of the motorcycle frame for the motorcycle of FIG. 1 with the axle bolt intentionally omitted for clarity.
Figure 5:
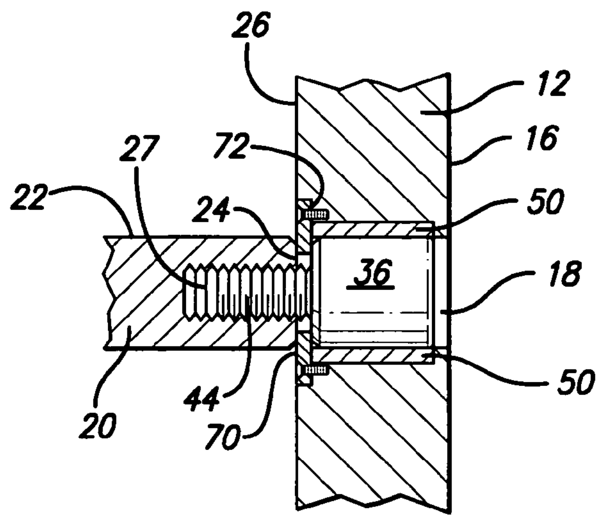
FIG. 5 is a vertical cross-section view taken along the line 5-5 in FIG. 1 and showing certain of the components of FIG. 2 as assembled.

Referring to FIG. 1, a motorcycle 10 includes a frame 12 on which is mounted a motor 13 and a seat 15. The cycle frame 12 is adapted for use with a front wheel 17 that is mounted on a front axle 19 and a rear wheel 14 that in turn is mounted on a rear axle and that is coupled so as to be driven by the motor 13. The frame 12 includes an outer wall portion 16 defining a distal opening 18 having a horizontally-elongated, oblong shape. As best seen in FIGS. 2, 4 and 5, the rear axle 20 has a generally cylindrically-shaped side wall 22 and a generally planar axle end wall 24. The rear axle 20 further has an internally-threaded axle bore 27 that extends coaxially into the axle end wall 24.

In addition to the outer wall portion 16, the cycle frame 12 has an inner wall portion 26 that faces the rear wheel 14. The inner wall portion 26 defines a proximate opening 32 that is surrounded by a flange 30 and that extends into a frame cavity 28 that is formed by a plurality of interior walls 33. Similarly the distal opening 18 of the outer wall portion 16 extends into the frame cavity 28 and is disposed generally on the opposite side of the frame cavity 28 as the proximate opening 32. The frame 12 further has a bore 34 extending longitudinally from the frame cavity 28 through the frame in a direction generally away from the rear axle 20 and the front axle 19.

Figure 3:
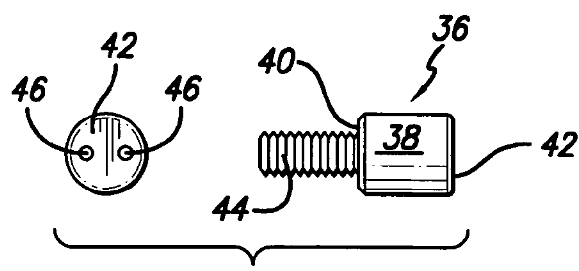
FIG. 3 is an enlarged side and end elevation view of an axle bolt of the motorcycle of FIG. 1.

As best seen in FIG. 3, an axle coupler or bolt 36 has a generally cylindrically-shaped body portion 38 with a distal end wall 42 and a proximate end wall 40. Two holes 46 that mate with a spanner wrench are disposed in the distal end wall and are for use in torquing the bolt 36. The axle bolt 36 has a threaded extension 44 projecting from the proximate end wall 40 that can be threadedly received in the axle bore 27. (FIG. 5) As explained further below, the body portion 38 and threaded extension 44 can be inserted into the cavity 28 through the cycle frame distal opening 18 for subsequent engagement with the axle 20.

Referring again to FIGS. 2, 4 and 5, an adjustor member 50 or block can be inserted into the frame cavity 28 through the proximate opening 32 of the frame 12. The member 50 can slide back and forth longitudinally within the frame cavity 28. The adjustor member 50 has a member opening 52 that can surround the axle bolt body 38 so as to provide a bearing surface for the body 38. A threaded bore 54 is longitudinally disposed in the member 50 for alignment with the cycle frame bore 34 when the adjustor member 50 is placed in the frame cavity 28. An actuator or adjustor bolt 56 can be inserted through the cycle frame bore 34 and threadedly engaged with the adjustor bore 54 for longitudinal movement of the adjustor member 50.

A frame cover piece 60 having an exterior side or face 70 and an interior face 72 is adapted to cover the frame proximate opening 32. The cover piece 60 seats on the flange 30 surrounding the proximate opening 32 of the frame 12. Threaded holes 31 are disposed in the flange 30 to mate with a plurality of screws 62 that can be used to secure the cover piece 60 to the frame 12. When the cover piece 60 is secured to the frame 12 in this manner, the adjustor member 50 is held in the frame cavity 28 while still able to slide back and forth longitudinally within the cavity 28. The cover piece 60 has a horizontally-elongated, oblong opening 64 that permits the axle bolt threaded extension 44 to extend through the opening 64 for engagement with the axle bore 27. When so engaged, the end wall 24 of the axle 20 abuts the exterior face 70 of the cover piece 60 and the proximate end wall 40 of the axle bolt 36 abuts the interior face 70 of the cover piece 60. Thus the cover piece provides a riding surface for the axle 20 thereby preventing scratches or marring of the surface of the cycle frame 12. Moreover, the cover piece 60 can be stainless steel or chrome-plated for durability and an aesthetically pleasing appearance.

As best seen in FIG. 5, no portion of the axle bolt 36 extends out of the cavity 28 beyond the cycle frame distal opening 18 when these components are assembled, i.e., when the adjustor member 50 is in the frame cavity 28, when the axle bolt body 38 is in the cavity 28 and surrounded by the adjustor member opening 52, and when the axle bolt threaded extension 44 is engaged with the axle bore 27. This recessed assembly of the axle bolt 36 can provide a smooth and aesthetically pleasing appearance.

While the assembly shown in FIGS. 1-5 is on the right side of the cycle, it should be appreciated that a similar assembly may be used on the left side.

In operation, the adjustor member 50 is inserted into the frame cavity 28 through the frame proximate opening 32 so that the adjustor member bore 54 is aligned with the frame bore 34. The adjustor bolt 56 is inserted into the frame bore 34 and rotated so that the adjustor bolt threads engage the threads of the frame bore 34. The frame cover piece 60 is seated on the flange 30 surrounding the frame proximate opening 32 thereby enclosing the adjustor member 50 in the frame cavity 28. The plurality of screws 62 is then used to secure the cover piece 60 to the frame 12.

The axle bolt 36 is inserted into the frame cavity 28 through the frame distal opening 18 so that the body portion 38 of the bolt 36 is disposed within the cavity 28 in a mating relationship with the adjustor member opening 52 and so that the threaded extension 44 of the bolt 36 protrudes out of the cavity 28 in an inward direction through the frame proximate opening 32 and the cover piece opening 64. The end wall 24 of the axle 20 is then aligned with the threaded extension 44 of the bolt 36 so that the extension 44 engages the threads in the axle bore 27. A spanner wrench (not shown) is inserted into the axle bolt holes 46 and rotated thus causing the axle bolt 36 to rotate and more fully engage the axle 20.

The bolt 36 is tightened somewhat until the axle end wall 24 lightly abuts or is in close proximity to the exterior face 70 of the cover piece 60 and until the axle bolt proximate end wall 40 lightly abuts or is in close proximity the interior face 72 of the cover piece 60. The axle 20, the adjustor member 50 and the axle bolt 36 are now coupled together. The adjustor bolt 56 is rotated to "pull" the adjustor member 50, the axle bolt 36 and the axle 20 longitudinally in a direction toward the rear of the frame 12 thereby providing the required tension on the axle 20 and drive chain (not shown) that is coupled to the axle 20. Once the required tension is reached, the axle bolt 36 is tightened further to hold the axle 20 in place relative to the frame 12. It should be noted that the dimensions of the axle bolt 36 are such that when the axle bolt 36 is engaged with the axle 20, no portion of the bolt 36 extends outside of the frame cavity 28 through the distal opening 18 of the frame 12.

In an alternative embodiment of the invention, the actuator comprises an adjustor bolt having a bolt head and a threaded extension and can be placed into a frame bore in reverse. That is, an adjustor block or member has a relatively smooth member bore without internal threads. The adjustor bolt can be slid into the member bore until the head of the bolt is seated against a surface of the adjustor member. The adjustor bolt can likewise be inserted through the bore of the cycle frame until the threaded extension portion of the bolt extends outside of the frame. An adjustor nut can be engaged outside of the frame with the adjustor bolt and twisted in order to "pull" the adjustor member longitudinally in a direction toward the rear of the frame.

In yet another alternative embodiment, a frame bore extends into a frame cavity from the front portion of a frame rather than from the rear portion as shown in FIG. 2. To permit this, however, the cycle frame design or geometry may differ from that shown in FIG. 2. In this embodiment, the frame bore is aligned with a forward end of an adjustor member and has internal threads for engagement with an actuator or adjustor bolt. The adjustor bolt can be twisted into the frame bore so that it contacts the forward end of the adjustor member thereby "pushing" it longitudinally in a direction toward the rear of the frame.

While the embodiment of FIGS. 1-5 incorporates an axle bolt, it will be appreciated by those skilled in the art that alternative axle couplers may be used to secure an axle to an adjustor block or member housed within a frame cavity. For example, the axle coupler could comprise an axle nut having internal threads. The axle could have a reduced-diameter, screw-threaded extension that can be inserted into the frame cavity and engaged with the internal threads of the axle nut. Axle couplers of other geometries and designs may be used as well.

Although FIG. 1 illustrates a motorcycle, alternative embodiments of the invention may include bicycles, tricycles and other vehicles.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. An apparatus for positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, said vehicle frame further having a vehicle frame bore extending from the frame cavity, the apparatus comprising:

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle;

an actuator adapted for insertion into the vehicle frame bore and adapted to move the adjustor member longitudinally within the frame cavity; and a frame cover piece adapted to cover at least a portion of the frame proximate opening when the adjustor member is in the frame cavity, said cover piece having a cover piece opening adapted to permit a portion of one of the axle coupler and the first axle to extend through the cover piece opening when the axle coupler is in engagement with the first axle.

2. An apparatus for positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, said vehicle frame further having a vehicle frame bore extending from the frame cavity, the apparatus comprising:

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle; and an actuator adapted for insertion into the vehicle frame bore and adapted to move the adjustor member longitudinally within the frame cavity, wherein the vehicle frame bore extends longitudinally from the frame cavity through the frame in a direction generally away from the first axle and the second axle and wherein the actuator comprises an elongated threaded member, and wherein the adjustor member has a threaded bore in register with the vehicle frame bore when the adjustor member is disposed in the frame cavity and wherein the elongated threaded member is adapted to engage the adjustor member threaded bore.

3. An apparatus for positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, said vehicle frame further having a vehicle frame bore extending from the frame cavity, the apparatus comprising:

an axle coupler adapted for engaging the first axle, wherein the axle coupler has a body and a coupler threaded extension and wherein the first axle has a threaded bore adapted to engage the coupler threaded extension;

an adjustor member adapted to fit in the frame cavity and for movement longitudinally within the frame cavity, said adjustor member having a bearing surface adapted to engage the axle coupler when the axle coupler is in engagement with the first axle;

an actuator adapted for insertion into the vehicle frame bore and adapted to move the adjustor member longitudinally within the frame cavity; and a frame cover piece adapted to cover at least a portion of the frame proximate opening when the adjustor member is in the frame cavity, said cover piece having a cover piece opening adapted to permit the coupler threaded extension to extend through the cover piece opening when the coupler threaded extension is in engagement with the first axle threaded bore.

4. The apparatus of claim 3 wherein the first axle has an end, wherein the first axle threaded bore has an opening at the first axle end, wherein the cover piece has an outer surface and an inner surface, and wherein the cover piece is further adapted to permit at least a portion of the axle end to abut the outer surface of the cover piece and to permit at least a portion of the axle coupler body to abut the inner surface of the cover piece when the threaded extension is in engagement with the first axle threaded bore.

5. An apparatus for positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, said vehicle frame further having a vehicle frame bore extending from the frame cavity, the apparatus comprising:

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle; and an actuator adapted for insertion into the vehicle frame bore and adapted to move the adjustor member longitudinally within the frame cavity, wherein the axle coupler comprises a nut and the first axle has external threads adapted to mate with the nut.

6. An apparatus for positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, said vehicle frame further having a vehicle frame bore extending longitudinally from the frame cavity through the frame in a direction generally away from the first axle and the second axle, the apparatus comprising:

an axle coupler adapted for insertion through the vehicle frame distal opening and for engaging the first axle;

an adjustor member adapted for insertion into the frame cavity through the proximate opening and for movement longitudinally within the frame cavity, said adjustor member having a bearing surface adapted to engage the axle coupler when the axle coupler is in engagement with the first axle, said adjustor member further having an adjustor member coupler adapted for alignment with the vehicle frame bore when the adjustor member is disposed in the frame cavity;

an actuator adapted for insertion into the vehicle frame bore and for engagement with the adjustor member coupler, said actuator being further adapted to move the adjustor member longitudinally within the frame cavity; and a frame cover piece adapted to cover at least a portion of the frame proximate opening and to secure the adjustor member in the frame cavity, said cover piece having a cover piece opening adapted to permit a portion of one of the axle coupler and the first axle to extend through the cover piece opening when the axle coupler is in engagement with the first axle.

7. The apparatus of claim 6, wherein the axle coupler has a proximate end adapted to engage the first axle and a distal end, and wherein the axle coupler distal end is disposed within the vehicle frame cavity when the axle coupler is in engagement with the first axle.

8. The apparatus of claim 6, wherein no portion of the axle coupler extends outside of the frame cavity through the vehicle frame distal opening when the axle coupler is in engagement with the first axle.

9. The apparatus of claim 6, wherein the axle coupler has an elongated threaded member and the first axle has a threaded bore adapted to engage the elongated threaded member.

10. The apparatus of claim 6, further comprising a plurality of screws adapted to secure the frame cover piece to the frame.

11. An apparatus for positioning a first axle with respect to a cycle frame adapted for use with the first axle and a second axle, said first axle having a generally cylindrically-shaped side wall and a generally planar axle end wall, said first axle further having an internally-threaded axle bore extending coaxially into the axle end wall, said cycle frame having an inner wall portion, an outer wall portion and a frame cavity, said inner wall portion defining a proximate opening extending into the frame cavity, said outer wall portion defining a distal opening extending into the frame cavity and disposed generally on the opposite side of the frame cavity as the proximate opening, said cycle frame having a cycle frame bore extending longitudinally from the frame cavity through the frame in a direction generally away from the first axle and the second axle, the apparatus comprising:

an axle bolt having a generally cylindrically-shaped body portion with a distal end wall and a proximate end wall, said axle bolt further having a threaded extension projecting from the proximate end wall and adapted to engage with the axle bore, said body portion and threaded extension being further adapted for insertion through the cycle frame distal opening;

an adjustor member adapted for insertion into the frame cavity through the proximate opening and for movement longitudinally within the frame cavity, said adjustor member having a member opening adapted to surround at least a portion of the axle bolt body portion, said adjustor member further having a threaded adjustor bore adapted for alignment with the cycle frame bore when the adjustor member is disposed in the frame cavity;

an adjustor bolt adapted for insertion through the cycle frame bore and for engagement with the adjustor bore; and a frame cover piece adapted to cover at least a portion of the frame proximate opening and to secure the adjustor member in the frame cavity, said cover piece having a cover piece opening adapted to permit the axle bolt threaded extension to extend through the cover piece opening for engagement with the axle bore;

wherein the axle bolt distal end wall is disposed within the frame cavity when the adjustor member is disposed in the frame cavity, when the at least part of the axle bolt body portion is surrounded by the adjustor member opening, and when the axle bolt threaded extension is engaged with the axle bore.

12. A cycle frame for use with a first axle and a second axle, comprising:

a plurality of frame interior walls forming a frame cavity wherein one of said plurality of interior walls has a cycle frame bore extending from the frame cavity;

a frame inner wall portion defining a proximate opening extending into the frame cavity;

a frame outer wall portion defining a distal opening extending into the frame cavity;

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle;

an actuator adapted for insertion into the cycle frame bore and adapted to move the adjustor member longitudinally within the frame cavity; and a frame cover piece adapted to cover at least a portion of the frame proximate opening when the adjustor member is in the frame cavity, said cover piece having a cover piece opening adapted to permit a portion of one of the axle coupler and the first axle to extend through the cover piece opening when the axle coupler is in engagement with the first axle.

13. A cycle frame for use with a first axle and a second axle, comprising:

a plurality of frame interior walls forming a frame cavity wherein one of said plurality of interior walls has a cycle frame bore extending from the frame cavity;

a frame inner wall portion defining a proximate opening extending into the frame cavity;

a frame outer wall portion defining a distal opening extending into the frame cavity;

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle; and an actuator adapted for insertion into the cycle frame bore and adapted to move the adjustor member longitudinally within the frame cavity, wherein the cycle frame bore extends longitudinally from the frame cavity through the frame in a direction generally away from the first axle and the second axle and wherein the actuator comprises an elongated threaded member, and wherein the adjustor member has a threaded bore in register with the cycle frame bore when the adjustor member is disposed in the frame cavity and wherein the elongated threaded member is adapted to engage the adjustor member threaded bore.

14. A motorcycle comprising:

a first axle and a second axle;

a cycle frame;

a motor mounted on the cycle frame;

a plurality of frame interior walls forming a frame cavity wherein one of said plurality of interior walls has a cycle frame bore extending from the frame cavity;

a frame inner wall portion defining a proximate opening extending into the frame cavity;

a frame outer wall portion defining a distal opening extending into the frame cavity;

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle;

an actuator adapted for insertion into the cycle frame bore and adapted to move the adjustor member longitudinally within the frame cavity; and a frame cover piece adapted to cover at least a portion of the frame proximate opening when the adjustor member is in the frame cavity, said cover piece having a cover piece opening adapted to permit a portion of one of the axle coupler and the first axle to extend through the cover piece opening when the axle coupler is in engagement with the first axle.

15. A motorcycle comprising:

a first axle and a second axle;

a cycle frame;

a motor mounted on the cycle frame;

a plurality of frame interior walls forming a frame cavity wherein one of said plurality of interior walls has a cycle frame bore extending from the frame cavity;

a frame inner wall portion defining a proximate opening extending into the frame cavity;

a frame outer wall portion defining a distal opening extending into the frame cavity;

an axle coupler adapted for engaging the first axle;

an adjustor member adapted to fit in the frame cavity and for movement longitudinally within the frame cavity, said adjustor member having a bearing surface adapted to engage the axle coupler when the axle coupler is in engagement with the first axle; and an actuator adapted for insertion into the cycle frame bore and adapted to move the adjustor member longitudinally within the frame cavity, wherein the cycle frame bore extends longitudinally from the frame cavity through the frame in a direction generally away from the first axle and the second axle, wherein the actuator comprises an elongated threaded member, wherein the adjustor member has a threaded bore in register with the cycle frame bore when the adjustor member is disposed in the frame cavity and wherein the elongated threaded member is adapted to engage the adjustor member threaded bore.

16. A method of positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, the method comprising:

inserting an adjustor member having a bearing surface into the frame cavity;

inserting an axle coupler into the frame cavity so that at least a part of the axle coupler engages the bearing surface of the adjustor member;

engaging the first axle with the axle coupler; and moving the adjustor member longitudinally within the frame cavity with an actuator, wherein the step of inserting the adjustor member into the frame cavity further comprises inserting the adjustor member into the frame cavity through the proximate opening.

17. A method of positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, the method comprising:

inserting an adjustor member having a bearing surface into the frame cavity;

inserting an axle coupler into the frame cavity so that at least a part of the axle coupler engages the bearing surface of the adjustor member;

engaging the first axle with the axle coupler;

moving the adjustor member longitudinally within the frame cavity with an actuator, wherein the vehicle frame further has a vehicle frame bore extending longitudinally from the frame cavity through the frame in a direction generally away from the first axle and the second axle, and wherein the actuator has an elongated threaded member, wherein the adjustor member has an adjustor member threaded bore adapted for alignment with the vehicle frame bore when the adjustor member is in the frame cavity, and engaging the adjustor member threaded bore with the elongated threaded member.

18. A method of positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, the method comprising:

inserting an adjustor member having a bearing surface into the frame cavity;

inserting an axle coupler into the frame cavity so that at least a part of the axle coupler engages the bearing surface of the adjustor member;

engaging the first axle with the axle coupler;

moving the adjustor member longitudinally within the frame cavity with an actuator; and covering at least a portion of the frame proximate opening with a frame cover piece having a cover piece opening adapted to permit a portion of one of the axle coupler and the first axle to extend through the cover piece opening when the axle coupler is in engagement with the first axle.

19. A method of positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, the method comprising:

inserting an adjustor member having a bearing surface into the frame cavity;

inserting an axle coupler into the frame cavity so that at least a part of the axle coupler engages the bearing surface of the adjustor member;

engaging the first axle with the axle coupler; and moving the adjustor member longitudinally within the frame cavity with an actuator, wherein the axle coupler has a proximate end and a distal end, wherein the first axle engages the axle coupler at the proximate end, and wherein the axle coupler distal end is disposed within the frame cavity when the axle coupler is in engagement with the first axle.

20. A method of positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, the method comprising:

inserting an adjustor member having a bearing surface into the frame cavity;

inserting an axle coupler into the frame cavity so that at least a part of the axle coupler engages the bearing surface of the adjustor member;

engaging the first axle with the axle coupler; and moving the adjustor member longitudinally within the frame cavity with an actuator, wherein no portion of the axle coupler extends outside of the frame cavity through the frame distal opening when the axle coupler is in engagement with the first axle.

21. A method of positioning a first axle with respect to a vehicle frame adapted for use with the first axle and a second axle, said vehicle frame having an inner wall portion, an outer wall portion and a frame cavity, said inner wall portion defining a proximate opening extending into the frame cavity, said outer wall portion defining a distal opening extending into the frame cavity, the method comprising:

inserting an adjustor member having a bearing surface into the frame cavity;

inserting an axle coupler into the frame cavity so that at least a part of the axle coupler engages the bearing surface of the adjustor member;

engaging the first axle with the axle coupler; and moving the adjustor member longitudinally within the frame cavity with an actuator, wherein the axle coupler includes an internally-threaded portion and the first axle has external threads adapted to mate with the internally-threaded portion.

* * * * *